April 11, 1961 — R. D. MacDONALD — 2,978,967
ROAD ROLLER
Filed Dec. 24, 1956 — 4 Sheets-Sheet 1

INVENTOR.
Raymore D. MacDonald
BY
Attorney

April 11, 1961
R. D. MacDONALD
2,978,967
ROAD ROLLER
Filed Dec. 24, 1956
4 Sheets-Sheet 2
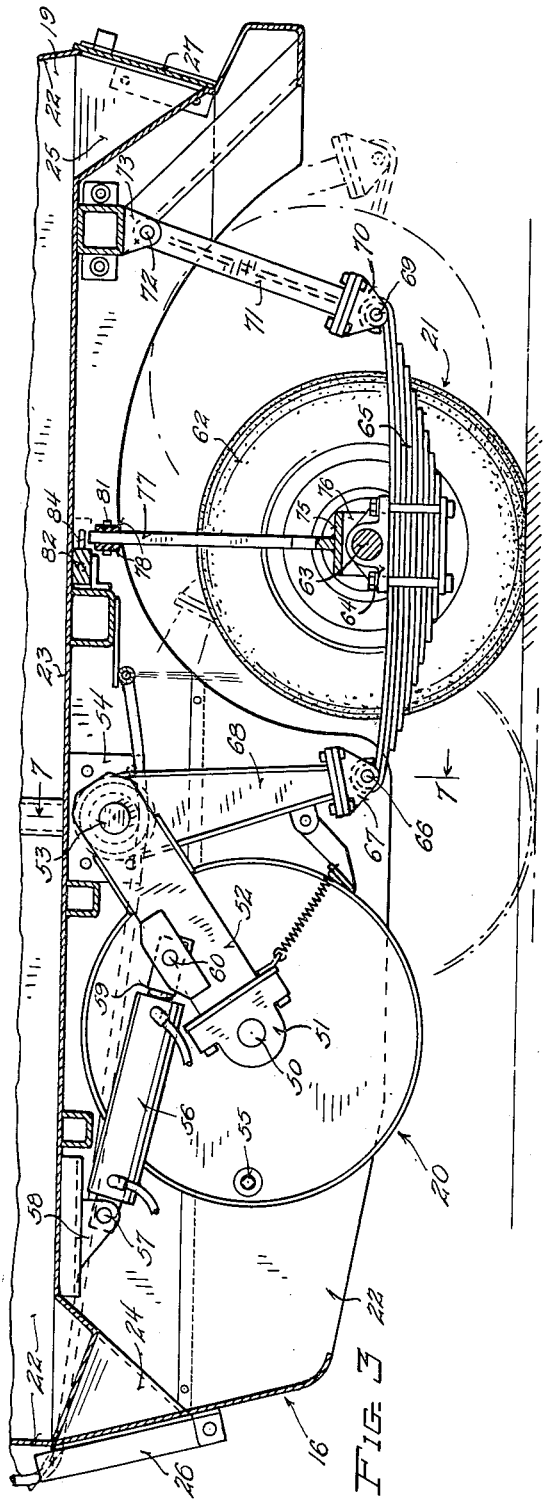
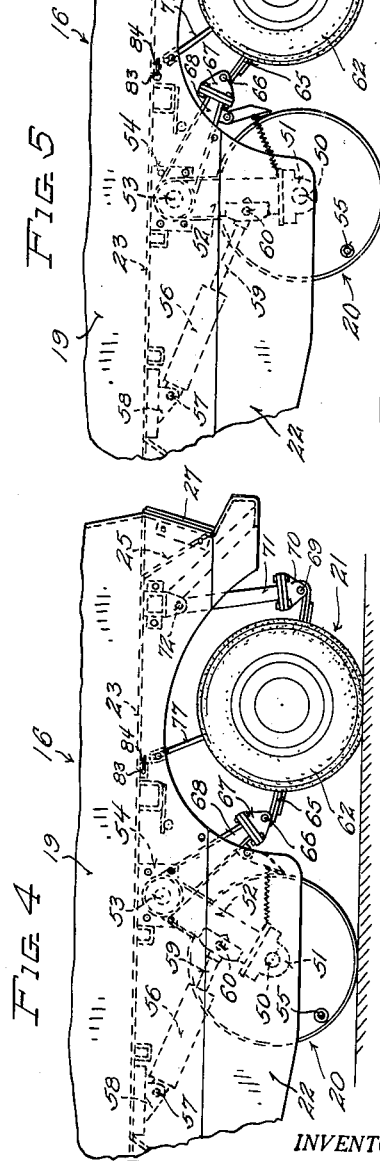
INVENTOR.
Raymore D. MacDonald
BY
Attorney April 11, 1961 — R. D. MacDONALD — 2,978,967
ROAD ROLLER
Filed Dec. 24, 1956 — 4 Sheets-Sheet 3
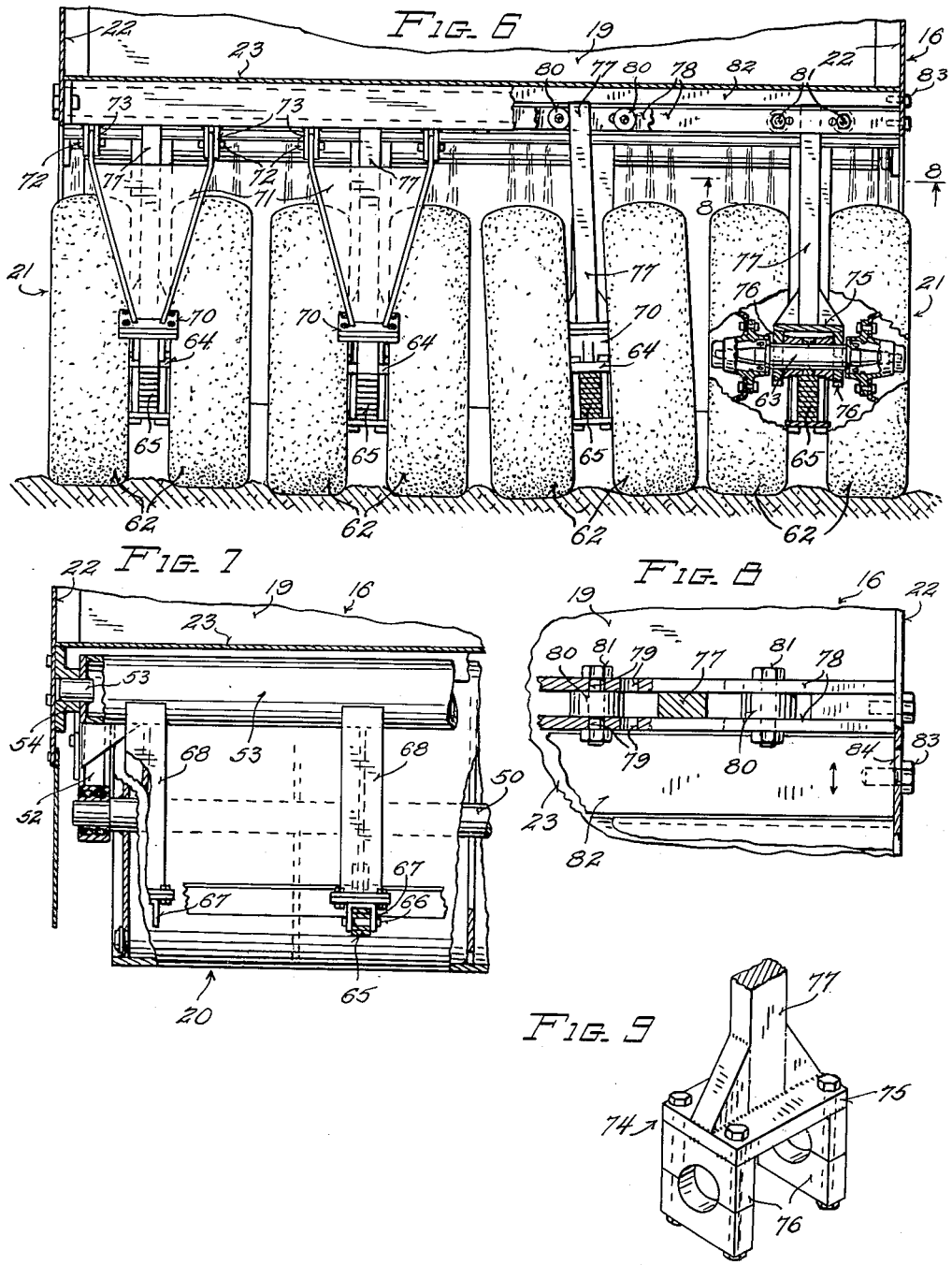
INVENTOR.
Raymore D. MacDonald
BY
Attorney

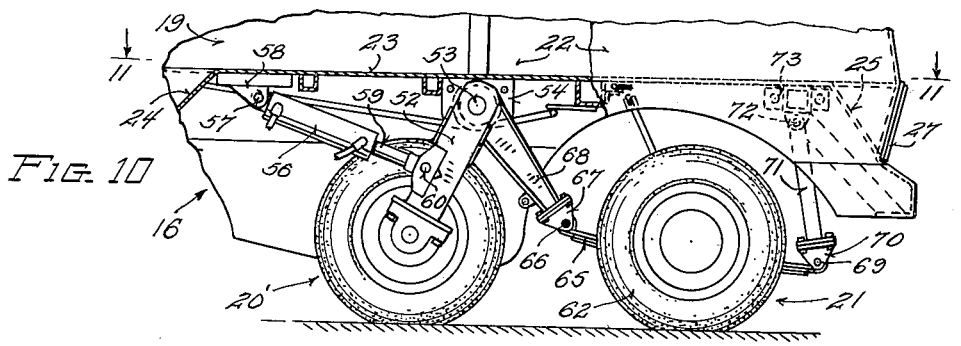
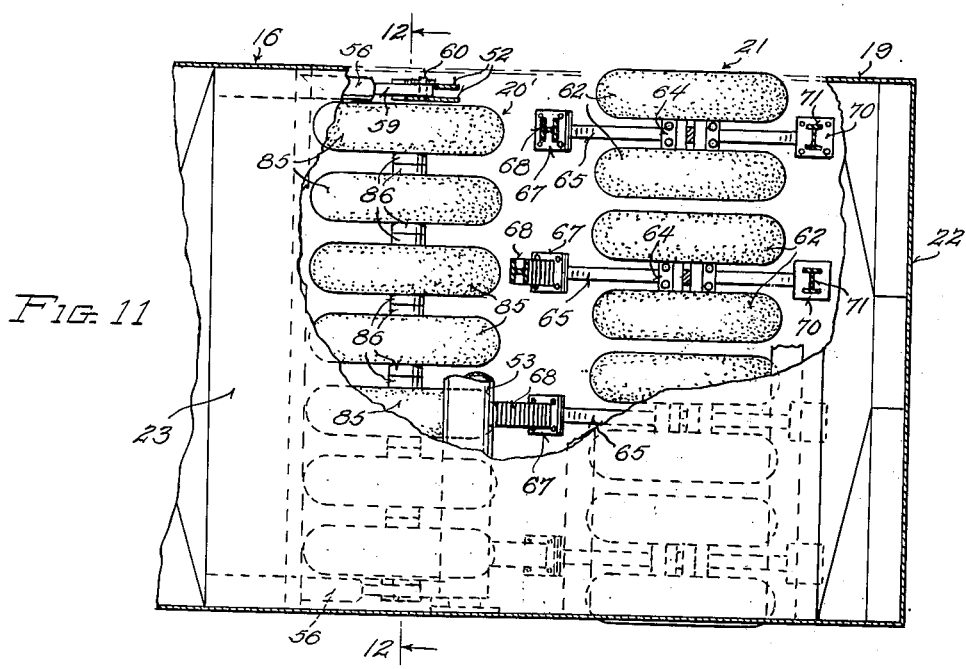
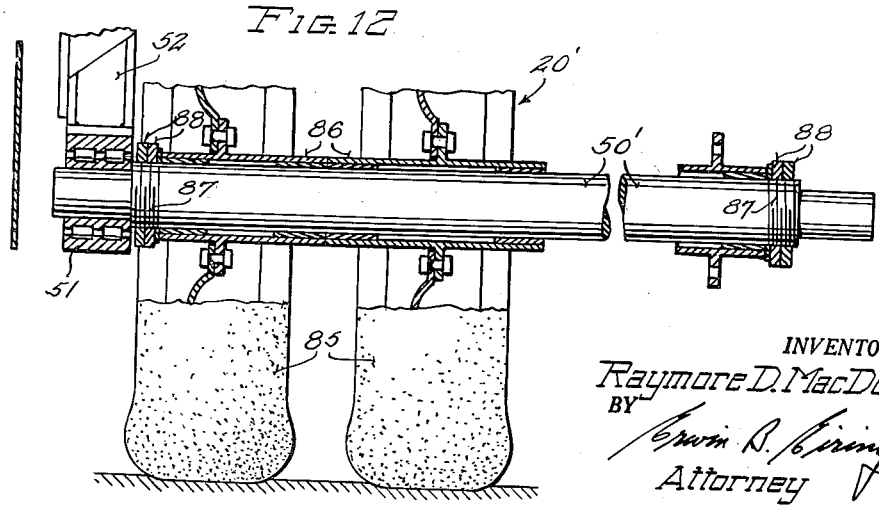

United States Patent Office 2,978,967
Patented Apr. 11, 1961

2,978,967
ROAD ROLLER
Raymore D. MacDonald, Eureka, Ill., assignor to Harry J. Seaman, Milwaukee, Wis.
Filed Dec. 24, 1956, Ser. No. 630,283
10 Claims. (Cl. 94—50)

This invention relates to wheeled vehicles and more particularly to road rollers or compactors generally used in road building.

While numerous forms of road rollers are in common use, it is a well known fact that each has certain limitations which curtail its use in one manner or another. Many of the road rollers are comparatively slow moving vehicles which require their being transported by trailer from one job to another. Other road rollers embody features which materially curtail their maneuverability. Still other forms of road rollers are provided with smooth tread ground-engaging rolls of substantial length with the result that their maneuverability and their aptness for self-propelled transportation from one job to another is virtually impossible.

The primary object of the present invention is to provide a new and improved road roller in the form of a wheeled vehicle which overcomes the inherent shortcomings of similar devices now in common use.

Another object of the present invention resides in the provision of a road roller including a two-wheeled type tractor unit coupled with a ballast-retaining trailer adapted to be selectively supported on either or both of a pair of substantially parallel ground-engaging rolls.

Another object of the present invention resides in the provision of a wheeled vehicle in the form of a road roller or compactor which includes a trailer having a pair of transversely extending substantially parallelly arranged ground-engaging rolls adapted to form either individual or joint support means for the trailer portion of the road roller.

Another object of the invention resides in the provision in a road roller of a pair of substantially parallel transversely extending ground-engaging trailer supporting rolls mounted on a common member which is rockable to selectively position one or the other or both of said rollers in ground-engaging position wherein the individual load supporting position of either of the rollers is disposed between the supporting position of both rollers.

Another object of the present invention resides in the provision of a road roller including a plurality of parallelly arranged ground-engaging rolls, at least one of which includes a plurality of axially aligned pairs of rubber tired ground-engaging wheels which are adapted, in ground-engaging position, to facilitate its use and afford a means on which the road roller may be transported from one job to another at relatively high speeds of from fifteen to twenty miles an hour.

Another object of the present invention resides in the provision of a road roller having a pair of transversely extending substantially parallel forwardly and rearwardly spaced trailer supporting rolls, one of which comprises a plurality of pairs of axially aligned pneumatic tired ground-engaging wheels, and the other comprises a ground-engaging roller having a substantially smooth surface.

Another object of the present invention resides in the provision in a road roller of a plurality of pairs of axially aligned pneumatic tired ground-engaging wheels, each pair of which are spring mounted to permit their independent lateral tilting movement to provide desired flexibility of the ground-engaging roll to facilitate the compacting of the surface material on the road.

Another object of the invention resides in the provision in a road roller of a ground-engaging roll composed of a plurality of axially aligned laterally spaced pairs of independently spring mounted pneumatic tired wheels, and means for restraining the torsional movement of the individual springs to limit the lateral tilting movement of each pair of wheels to obtain the desired even compacting of the road surfacing material.

Another object of the invention resides in the provision in a road roller of a ground-engaging roll composed of a plurality of axially aligned laterally spaced pairs of independently mounted pneumatic tired wheels, and means for limiting the flexing movement of the individual springs to fix the uppermost position of each pair of wheels when they are in ground-engaging position.

Other objects and advantages of the present invention will become apparent from the following description by illustrative embodiments of the invention shown in the accompanying drawings.

Figure 1:
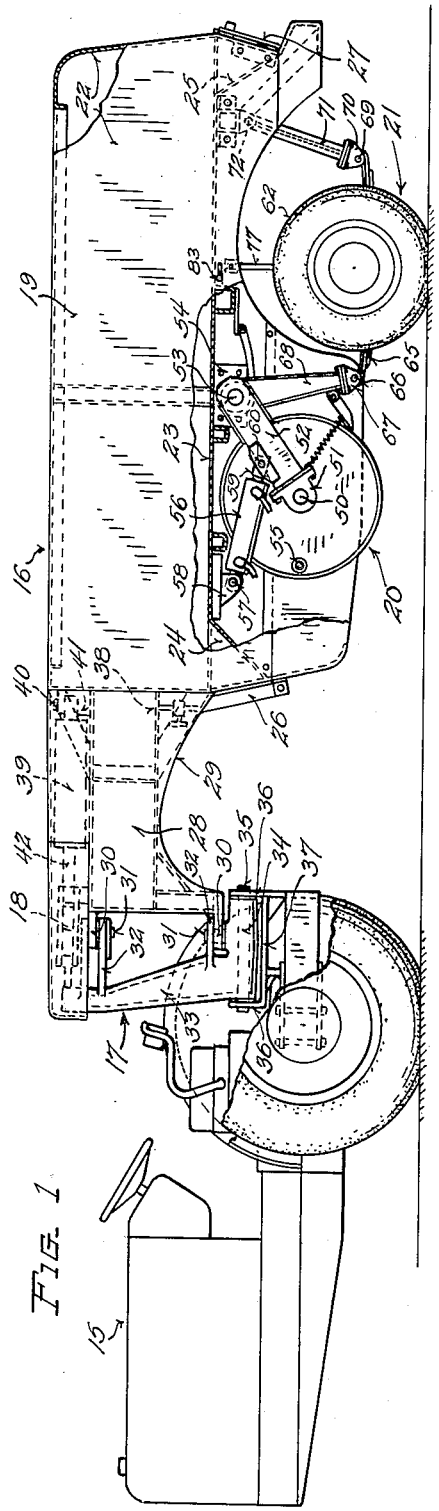
Figure 1 is a side elevational view of a road roller or compacting machine, constructed in accordance with the teachings of the present invention, with parts broken away to more clearly illustrate certain structural features.
Figure 2:
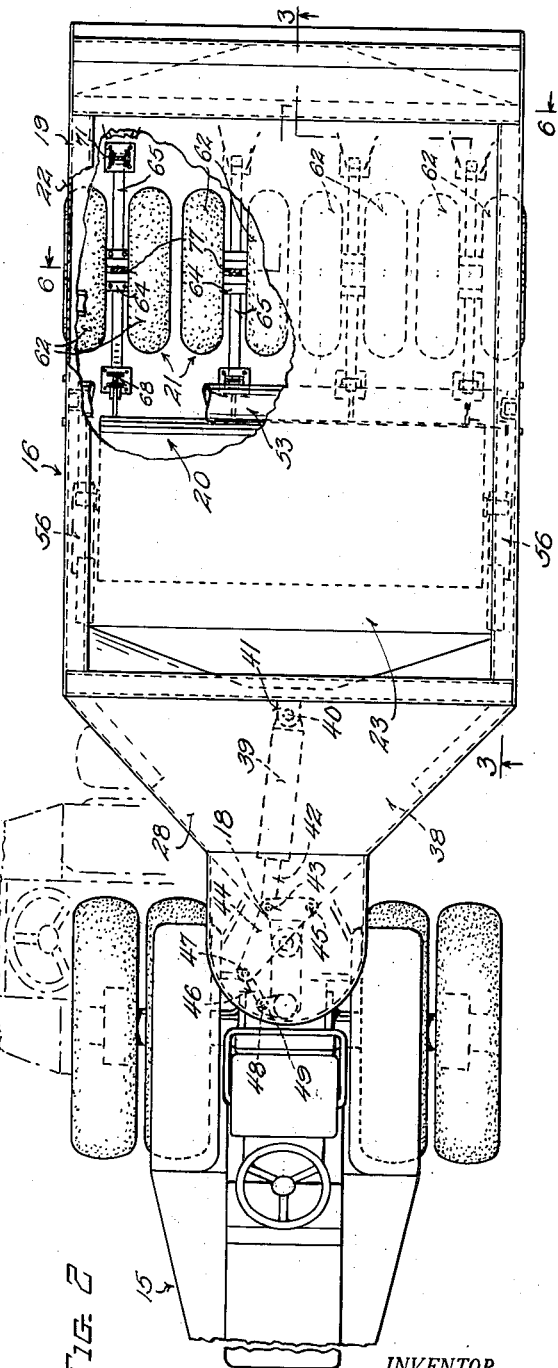
Fig. 2 is a top plan view of the device shown in Fig. 1 and including a dot-dash showing of the tractor unit disposed at an angle of substantially ninety degrees to its normal forward moving position to illustrate the maneuverability of the machine.

Fig. 3 is an enlarged vertical longitudinal sectional view, taken substantially on the line 3—3 of Fig. 2, illustrating the lower portion of the ballast retaining body, together with the parallelly arranged transversely extending ground-engaging rolls and their suporting means; the full line showing in this figure illustrating the trailer unit supported solely by the rear ground-engaging roll, and including a fragmentary dot-dash showing of the sole support of the trailer unit by the forward ground-engaging roll;

Fig. 4 is a fragmentary side elevational view of a portion of the trailer illustrating its joint support by both of the ground-engaging rolls;

Fig. 5 is a fragmentary side elevational view of a portion of the trailer showing its sole support by the forward ground-engaging roll;

Fig. 6 is a fragmentary transverse vertical sectional view, taken substantially on the line 6—6 of Fig. 2, showing the laterally spaced positioning of respective pairs of axially aligned pneumatic tired ground-engaging wheels which form one of the ground-engaging rolls, with parts broken away to illustrate the lateral tilting movement of one of the pairs of ground-engaging wheels, means for selectively limiting the vertical deflection of the wheel supporting springs, and the suspension means of one of said pairs of laterally tiltable ground-engaging wheels supported on the opposite ends of an axle carried by the central portion of a leaf spring;

Fig. 7 is a fragmentary transverse vertical sectional view, taken on the line 7—7 of Fig. 3, showing the rockable member which forms a support for one end of one of the ground-engaging rolls and a partial support for the other ground-engaging roll;

Fig. 8 is a fragmentary horizontal sectional view, taken on the line 8—8 of Fig. 6, showing adjustable means for limiting the amount of lateral tilting movement of one of the pairs of ground-engaging wheels together with an abutment member which is movable into a position to limit the vertical deflection of the spring which supports the pair of ground-engaging wheels;

Fig. 9 is a perspective view of the lower portion of a member supported on the axle which carries a pair of ground-engaging wheels and functions with cooperating means to limit the lateral torsional movement of the leaf spring to limit the tilting movement of the pair of ground-engaging wheels and also to limit the vertical deflection of the leaf spring;

Fig. 10 is a fragmentary side elevational view of a portion of a road roller or compacting machine illustrating the use of a plurality of substantially axially aligned pneumatic tired wheels to form both of the ground-engaging rolls;

Fig. 11 is a horizontal sectional view, taken on the line 11—11 of Fig. 10, with parts broken away to more clearly illustrate certain structural details of the device; and Fig. 12 is an enlarged fragmentary sectional view taken on the line 12—12 of Fig. 11, showing the mounting means for the pneumatic tired wheels which form one of the ground-engaging rolls.

Before entering into a detailed description of the illustrative embodiments of the present invention, it is believed advisable to describe the general purpose and function of the present road roller. It should be noted that the trailer unit of the present device may be selectively supported by either or both of the substantially parallel transversely disposed ground-engaging rolls. For the purpose of facilitating the rapid transporting of the present device along the highway from one job to another, it is possible to support the trailer portion of the unit upon a pneumatic tired ground-engaging roll so that a traveling speed of from fifteen to twenty miles an hour may be accomplished to facilitate the ready transportation of the road roller from place to place. In actual use in road building or surfacing, the initial compaction of the road materials is effected by one or more passes of the road roller over the road surface with the pneumatic tired ground-engaging roll forming the sole support for the trailer portion of the road roller.

It should also be noted that the pneumatic tired dual wheels of the tractor unit and the pneumatic tired wheels of the trailer supporting ground-engaging roll are disposed in a relationship such that they do not track. The spring mounting of the individual pairs of laterally tiltable pneumatic tired ground-engaging wheels is such that their contact with the surface of the road materials tends to knead and compact the materials. One or more passes of the road roller over the surface material of the roads, with the pneumatic tired wheels in ground-engaging position, will produce ridges on the road surface between the adjacent wheels of individual pairs of ground-engaging wheels and between the adjacent pairs of ground-engaging pneumatic tired wheels. Following the initial preparation of the road surface, the substantially smooth surfaced ground-engaging roll is lowered into ground-engaging position to contact the ridged surface of the road. The pneumatic tired ground-engaging roll has been elevated to a position such as is illustrated in Fig. 4, wherein it is out of contact with the road surface. The second step in the compacting of the road materials comprises a number of passes over the road surface with the smooth-surfaced roll forming the sole support for the trailer portion of the road roller. These passes effect the "ironing out" of the ridges left by the previous passes of the rubber tired roll over the road surface. The several passes of the road roller over the road surface with the smooth surfaced ground-engaging roll effects additional compacting of the road material in addition to the operation of "ironing out" the previously mentioned ridges. Further compaction and greater stability of the aggregate of the road material may be effected by repeating the passes of the road roller over the smooth surface of the road with the pneumatic tired ground-engaging roll forming the sole support for the trailer portion of the road roller. The minor ridges left by the spring mounted oscillating wheels of the pneumatic tired ground-engaging roll may be smoothed out by shifting the positions of the two ground-engaging rolls to again bring the smooth surfaced roller into contact with the road and effecting both the "ironing out" of the minor ridges to effect a perfectly smooth road surface. It should be noted that the succession of passes of the road roller over the road material can be effected to smooth out the ridges and ruts which may have been left by rolling contact between the pneumatic tired ground-engaging roll and the road material without effecting a change of grade or surface level of the finished roller. If desired, the above steps in the compacting of the road materials may be repeated until the desired compaction and density of the road materials is attained.

Referring more particularly to the accompanying drawing, the road roller or compactor chosen for illustrative purposes discloses a road roller constructed with the teachings of the present invention. The road roller comprises a tractor unit 15 and a trailer unit 16 joined by a suitable hitch 17 and steering mechanism 18.

The tractor unit 15 is of the conventional two-wheeled type provided with dual wheels on either side of its frame. The dual wheels are preferably of large diameter and provided with pneumatic tires. If desired the tractor unit 15 may include suitable differential mechanism to facilitate the maneuvering of the road roller.

The trailer unit 16 comprises a frame 19 including a substantially rectangular open topped ballast retaining body adapted to be supported on either or both of a pair of ground-engaging rolls 20 and 21.

The frame 19 and ballast retaining body include substantially vertically disposed marginal walls 22, and a substantially flat bottom 23. The forward portion of the bottom 23 is directed downwardly to form a chute 24 and the rearward portion of the bottom 23 is directed downwardly to form a chute 25. A suitable closure in the form of a door 26 is provided to close the open end of the chute 24 and a similar door 27 forms a closure for the rear chute 25. The doors 26 and 27 provide a ready means for the unloading of material from the ballast retaining body, if and when such operation is desirable. The forward end of the frame 19 is provided with a forwardly and inwardly projecting portion in the form of a goose neck 28, having a lower surface 29 disposed at a height sufficient to permit the tractor unit 15 to assume a position substantially at right angles to the longitudinal axis of the trailer 16 without interference between the tractor wheels and the lower surface 29 of the goose neck 28.

The hitch 17 which joins the tractor unit 15 with the trailer unit 16 includes a pair of vertically spaced ears 30 projecting forwardly from the goose neck 28. The ears 30 are provided with axially aligned bores adapted to receive pivot pins 31, which in turn are secured respectively in pairs of vertically spaced ears 32 which project rearwardly from the vertically disposed body portion of a hollow post 33 which includes an elongated horizontally disposed body portion 34 provided with a bore adapted to receive a longitudinally extending pivot pin 35 mounted in vertically projecting spaced ears 36 of a bracket 37 which is fixedly secured to the body portion of the tractor unit 15 in any suitable manner.

The goose neck portion 28 of the trailer unit 16 forms a tank or reservoir 38 adapted to hold water to be utilized for spraying the ground-engaging rolls 20 and 21 in the usual manner.

The steering mechanism 18 is contained within the upper portion of the goose neck 28 of the trailer unit 16. In the present instance, the steering mechanism 18 comprises a hydraulic cylinder 39 having one end pivotally mounted on a pin 40 carried by a mounting bracket 41 secured to the forward wall of the ballast box 19. The cylinder 39 houses a piston having a tail rod 42 projecting from the free end of the cylinder 39. The free end of the tail rod 42 is mounted on a pin 43 secured to a plate or bell crank 44 which in turn is mounted for horizontal swinging movement on a pivot pin 45 anchored in the neck of the trailer 16. A connecting link 46 has one of its ends mounted on a pin 47 carried by one arm of the bell crank 44 and its other end is mounted on a pin 48 secured adjacent the outer extremity of a lever 49 which is formed integral with and extends laterally from the hollow post 33.

The ground-engaging roll 20 lies transversely of and below the ballast box 19 of the trailer unit 16. In the embodiment of the invention illustrated in Figs. 1 through 5 and 7, the ground-engaging roll comprises a hollow cylindrical member having a substantially smooth surface throughout its entire length. The roll 20 is constructed in any approved manner and includes stiffening ribs or spokes to retain the surface of the roll against deflection. The roll 20 includes an axle 50 having its projecting ends journaled in bearing blocks 51 which are removably secured to the lower or free ends of a pair of arms 52. The upper ends of the arms 52 are secured in any approved manner, such as by welding, adjacent the opposite ends of a hollow shaft 53 journaled for rocking movement in pillow blocks 54 suitably anchored below the bottom 23 of the ballast box 19. The weight of the roll may be varied, in accordance with the particular requirements of the work at hand, by removing a plug 55 from the end wall of the roll 20 and filling the roll with the desired amount of water or other suitable ballast material.

A pair of hydraulic cylinders 56, disposed adjacent the opposite sides of the ballast box 19, provide actuating means for the adjustable positioning of the ground-engaging roll 20 to selectively elevate it out of contact with the ground, or lower it into contact with the ground. One end of each of the cylinders 56 is rockably supported on a pin 57 carried by a mounting bracket 58 secured in any appropriate manner to the underside of the bottom 23 of the ballast box 19. The cylinder 56 includes a piston having a tail rod 59 projecting from the free end of the cylinder 56. The outer extremity of the tail rod 59 is mounted on a pin 60 disposed intermediate the ends of the arms 52. When fluid from any appropriate source is directed into the upper ends of the cylinders 56, the pistons are moved toward the free ends of the cylinders to effect rotation of the arms 52 in a counterclockwise direction to lower the ground-engaging roll 20 from the full line to the broken line shown in Fig. 3. When fluid is directed onto the lower ends of the cylinders 56, the arms 52 move in a clockwise direction to elevate the roll 20 out of ground-engaging position.

The ground-engaging roll 21 comprises a plurality of pairs of axially aligned laterally spaced pneumatic tired wheels 62. Each of the wheels 62 is journaled for free rotating movement on opposite ends of a stub shaft 63 carried by a bracket 64 positioned on the upper surface of the central portion of a leaf spring 65. The forward extremity of each leaf spring is mounted on a pin 66 carried by a bracket 67 removably attached to the lower extremity of arm 68 having its upper end fixedly attached to the hollow shaft 53 in any suitable manner, such as by welding. It should be noted at this point that each of the arms 68 is disposed in fixed angular relationship with the arms 52 on which the roll 20 is mounted. The rear ends of the several leaf springs 65 are mounted on pins 69 carried by mounting brackets 70 which are removably attached to the lower extremities of arms 71, having their uper ends rockably mounted on pins 72 carried by laterally spaced brackets 73 secured to the bottom 23 of the ballast box 19 in any approved manner.

Since the forward supporting arm 68 of each pair of wheels 62 is attached to the rockably mounted hollow shaft 53 in fixed angular relationship with the arms 52 that form the support for the ground-engaging roll 20, it will be noted that the position of the ground-engaging roll 21 is also controlled by the hydraulic cylinders 56 so that its position with respect to the ground is altered simultaneously with the altering of the ground-engaging position of the roll 20.

By reason of the operation of the hydraulic cylinders 56 to one extreme position wherein the hollow shaft 53 and its associated arms 52 and 68 have been rotated in a counterclockwise direction under the action of the hydraulic cylinders 56 to elevate the roll 20 out of ground-engaging position and lower the roll 21 into ground-engaging position.

Referring more particularly to Fig. 4 of the accompanying drawing, it will be noted that both of the rolls 20 and 21 have been moved into ground-engaging position through the operation of the hydraulic cylinders 56 to an intermediate position wherein the hollow shaft 53 and the roll supporting arms 52 and 68 have been rotated in a counterclockwise direction to a position wherein both of the rolls 20 and 21 are in ground-engaging position.

Referring more particularly to Figure 5 of the accompanying drawing, it will be noted that the trailer unit 16 is supported solely by the ground-engaging position of the roll 20 under the action of the hydraulic cylinders 56 which have effected additional counterclockwise rotation of the hollow shaft 53 and its associate arms 52 and 68 to a position wherein the roll 20 assumes a ground-engaging position and the roll 21 has been elevated to a position wherein it is out of contact with the ground.

From the foregoing description of the several positions of the rolls 20 and 21, it will be noted that they may be either selectively or jointly moved to ground-engaging position in accordance with the will of the operator under the control of the hydraulic cylinders 56, to provide the desired support for the trailer unit 16 in order to facilitate the compacting of the roll surfacing material in the most expeditious manner.

Referring more particularly to Figure 6, of the accompanying drawing, it will be noted that the individual pairs of wheels 62, which combine to form the roll 21, are suspended in a manner which permits the independent and separate lateral tilting movement of each pair of wheels 62 through the independent torsional deflection of the several leaf springs 65 in response to varying conditions of the road surfacing material over which the individual pairs of wheels pass.

In order to accomplish the desired compacting of the road surfacing material, it is desirable to limit or restrain the lateral tilting movement of the individual pairs of wheels 62 of the roll 21. The means for limiting or restraining the lateral tilting movement of each pair of wheels 62 comprises the application of a yoke 74 on each pair of wheels 62. The yoke 74 comprises a flat plate 75 which overlies the stub shaft 63 and leaf spring 65 on which the wheels 62 are mounted. A pair of removably mounted laterally spaced bearing blocks 76, extending downwardly from the plate 75, serve to mount the yoke 74 on the stub shaft 63. A bar 77, suitably secured to the plate 75 extends upwardly therefrom and has its upper end guided for lateral sliding movement between a pair of rockably mounted spaced members 78 which extend below and transversely of the bottom 23 of the ballast box 19 and are suitably anchored thereto. A plurality of laterally spaced pairs of axially aligned holes 79, are formed in each of the members 78 for the purpose of adjustably positioning stop members 80 which are retained in lateral spaced relationship along the members 78 by the application of nuts and bolts 81 through selected aligned holes 79 in the members 78. The laterally spaced stop members 80 serve to contact the sides of the bar 77 to limit the torsional deflection of each leaf spring 65 to insure the desired distribution of load between the laterally spaced wheels of each pair of wheels 62.

Means is also provided for limiting the vertical deflection of the several leaf springs 65 which support the several pairs of wheels 62 that combine to form the roll 21. A bar or plate 82 disposed above and extending transversely below the bottom 23 of the ballast box 19 is supported by cap screws 83 which extend through horizontally disposed slots 84 which permit sliding movement of the bar 82 into and out of position above the upper extremities of the several bars or struts 77. When it is desired to limit the vertical deflection of the several leaf springs 65, the cap screws 83 are loosened and the bar or plate 82 is slid to a position wherein it lies immediately above the spaced members 78 which form a guide for the upper portion of the bar or strut 77. When the plate 82 is in the position just described, contact between its lower surface and the upper end of each of the struts 77 limit the vertical deflection of the several leaf springs 65. When it is desired to permit additional vertical deflection of the several leaf springs 65, the cap screws 83 may be loosened and the plate 82 moved to the position shown in Figure 8 of the drawing, wherein the plate 82 is moved out of alignment with the upper ends of the several struts 77 to permit their unimpeded vertical movement.

Figures 10, 11 and 12 of the accompanying drawing illustrate a modified form of the ground-engaging roll 20.

Referring more particularly to Fig. 12, the ground-engaging roll 20' comprises a plurality of pneumatic tired wheels 85 having their axially aligned hub portions 86 journaled for free rotation on an axle 50' having its ends journaled in bearing blocks 51 removably secured to the lower extremity of the arms 52, in the manner previously described. The portions of the axle 50' immediately adjacent the bearing blocks 51 are provided with threading 87 adapted to receive jam nuts 88 which serve to retain the ends of the several hub portions 86 of the wheels 85 in abutting relationship so as to preclude relative axial movement between the several wheels 85.

Referring more particularly to Fig. 11, it will be noted that the lateral positioning of the several wheels 85 is such that they are out of tracking alignment with the individual pairs of wheels 62, so as to insure a complete rolling contact with the road surfacing material over the entire width of the ground-engaging rolls 20' and 21 when both rolls 20' and 21 are in ground-engaging position, as shown in Fig. 10.

Since the actuating cylinders 56 utilized to effect the selective positioning of the ground-engaging rolls 20' and 21 into individual or joint load supporting position, in the modified form of the present invention, are identical in operation with those previously described, it will be understood that the only modification of the invention resides in the replacement of the smooth surfaced ground-engaging roll 20 with a roll 20' comprising a plurality of axially aligned laterally spaced pneumatic tired wheels 85. In all other respects, the device is identical in function and operation to that previously described. One advantage of utilizing rubber tired wheels on both of the ground-engaging rolls 20' and 21 resides in facilitating the seal coating operation on roads.

From the foregoing detailed description of the present invention, it will be noted that a simple and effective means has been provided whereby the load of the trailer unit 16 may be selectively borne by either or both of the ground-engaging rolls 20 and 21 to provide an improved means for compacting the road surfacing material by successive passes of the road roller over the surface of the material to be compacted. The first pass or passes being made with the smooth surface roll 20 in ground-engaging position followed by successive passes with the pneumatic tired ground-engaging roll 21 in contact with the road surfacing material and then followed by successive passes of the road roller with both ground-engaging rolls 20 and 21 in contact with the road surfacing material.

It should further be noted that the ground-engaging rolls 20 and 21, are mounted in fixed angular relationship with each other so that either or both rolls may be selectively moved into ground-engaging position under the operation of manually controlled actuating means, such as hydraulic cylinders 56 or other appropriate mechanism.

It should further be noted that the compacting action of the individual ground-engaging rolls 20, 20' and 21 effect different compacting actions. The initial passes of the road roller, with the smooth surfaced ground-engaging roll 20, performs the initial compacting action. Successive passes of the road roller with the pneumatic roll 21 in contact with the surface of the road effects additional compacting action on the road surface material. Further passes of the road roller, with both rolls 20 and 21 in ground-engaging position, effects the further compacting of the road surfacing material by smoothing out the minor ruts left by the device when the pneumatic tired ground-engaging roll 21 comprises the sole support for the trailer unit.

It should further be noted that the individual suspension of separate pairs of laterally spaced wheels 62, which combine to form the ground-engaging roll 21, affords a simple and effective means for compensating for variations in the density of the road surfacing material.

The means for limiting the lateral tilting movement of individual pairs of wheels 62 provides an improved means for varying the pressure between the individual wheels of each separately mounted pair.

The means for limiting the upward movement of the pneumatic tired roll 21, under the action of the leaf springs 65, provides means for insuring the uniform pressure applied to the road surfacing material by each pair of individually sprung ground-engaging wheels.

In addition to having several advantages in road rollers, the present invention utilizing resiliently mounted rubber tired wheels for one of the ground-engaging rolls, the invention may be utilized with equal facility on other types of heavy duty trailer units.

While the invention has been described in considerable detail in the foregoing specification, it is to be understood that various changes may be made in its embodiments without departing from or sacrificing any of the advantages hereinafter claimed.

I claim:

1. A road rolling vehicle comprising a ballast retaining frame, a transversely disposed shaft rotatably mounted on said frame, a pair of elongated members fixedly positioned in laterally spaced relationship on said transverse shaft, a cylindrical roll having a rigid tread surface rotatably mounted between said pair of elongated members, additional laterally spaced members attached to said transverse shaft in fixed angular relationship with said first named pair of elongated members, a second roll comprising a plurality of pairs of laterally spaced pneumatic wheels, independent axles for each pair of said wheels, independent spring suspension means for each of said axles, each of said independent spring means being fixedly attached intermediate its ends to one of said independent axles and having one of its ends pivotally attached to one of said additional laterally spaced members, a second support for the other end of each of said independent spring suspension means, said second support having one of its ends rockably attached to said frame and its other end in pivotal connection with said spring means, and power operated means for swinging said angularly fixed members to alter the position of said rolls with respect to each other to thereby selectively position one or both of said rolls in ground-engaging position.

2. A road rolling vehicle comprising a ballast retaining frame, a support for said frame comprising a plurality of pairs of pneumatic tired wheels disposed in transverse spaced relationship with said frame, independent axles for each pair of wheels, independent spring suspension means for each of said axles, said independent spring suspension means being fixedly attached intermediate its ends to each of said independent axles between each pair of said wheels, a plurality of pairs of spaced spring supports pivotally mounted on said frame, each of said independent spring suspension means having its ends pivotally connected to respective pairs of said pivotally mounted spring supports, said individual spring suspension means yieldably resisting the lateral tilting movement of its associated pair of wheels, an upwardly directed member rigidly mounted and positioned between each pair of wheels, and cooperating stop means disposed adjacent the upper end of said upwardly extending member and engageable therewith to limit the extent of lateral tilting movement of each of said pair of wheels.

3. A road rolling vehicle comprising a ballast retaining a frame, a support for said frame comprising more than two pairs of pneumatic tired wheels disposed in transverse spaced relationship with said frame, independent axles for each pair of said wheels, independent spring suspension means for each of said axles, said independent spring suspension means being fixedly attached intermediate its ends to each of said axles between each pair of said wheels, a plurality of pairs of spaced spring supports pivotally mounted on said frame, each of said independent spring suspension means having its end pivotally attached to respective pairs of said pivotally mounted spring supports, said independent spring suspension means yieldably resisting the torsional deflection of said spring suspension means and the lateral tilting movement of said associated pairs of wheels, an upwardly extending member mounted on each independent axle between said associated pair of wheels, and stop means positioned above and engageable with the free end of said upwardly extending member to limit the vertical deflection of said spring suspension means.

4. A road rolling vehicle comprising ballast retaining frame, a transversely extending shaft rotatably mounted on said frame, a pair of transversely extending parallelly disposed rolls, one of said rolls comprising a plurality of laterally spaced axially aligned pneumatic tired wheels and the other of said rolls comprising more than two pair of pneumatic tired wheels, independent axles for each pair of wheels on said last named roll, mounting means fixedly attached to said transversely extending shaft for retaining said rolls in fixed relationship with each other, said mounting means comprising a partial support for said plurality of laterally spaced axially aligned pneumatic tired wheels and the partial support for the plurality of more than two pairs of pneumatic tired wheels of said other roll, independent spring suspension means connected intermediate its ends to the independent axle between the pneumatic tired wheels of each pair forming said last named roll, one end of said spring being pivotally attached to said mounting means, a second support for the other end of said spring suspension means, said support having its ends pivotally attached to said frame and said spring suspension means, and power operated means attached to said mounting means for swinging the same to simultaneously alter the elevation of one of said rolls with respect to the other whereby one or both of said rolls may be moved into ground-engaging position to form the support for the vehicle.

5. A road rolling vehicle comprising a ballast retaining frame, a transversely extending shaft rotatably mounted on said frame, a pair of transversely extending parallelly disposed rolls, mounting means fixedly attached to said transversely extending shaft to retain said rolls in fixed parallel axial relationship with each other, one of said rolls comprising more than two pair of laterally spaced pneumatic wheels, the other said rolls comprising a cylindrical member having a rigid tread surface, independent axles for each pair of wheels of said first named roll, independent spring suspension means for each of said axles, each of said independent spring suspension means being connected intermediate its ends to each of said independent axles between each pair of wheels, each of said independent spring means having one of its ends pivotally attached to said mounting means, a second support for the other end of each of said independent spring suspension means, said second support having one of its ends rockably attached to said frame and its other end in pivotal connection with said spring means, said independent spring suspension means yieldably resisting torsional deflection and the lateral tilting movement of its associated pair of wheels, a vertically extending member attached to each of said independent axles, stop means adjustably positioned adjacent the opposite sides of the upper end of said upwardly extending member for contact with said member to limit the lateral tilting movement of said member and its associated pair of wheels, and power operated means attached to said mounting means for swinging said mounting means to simultaneously alter the relative elevation of said rolls whereby one or both of said rolls may be moved in ground-engaging position to form the support for said vehicle.

6. A road rolling vehicle comprising a ballast retaining frame, a transversely extending shaft rotatably mounted on said frame, a pair of transversely extending parallelly disposed rolls, mounting means fixedly attached to said transversely extending shaft to retain said rolls in fixed parallel relationship with each other, one of said rolls comprising more than two pair of laterally spaced pneumatic wheels, the other of said rolls comprising a cylindrical member having a rigid tread surface, independent axles on which each of said pair of wheels of said first named roll are mounted, independent spring suspension means attached intermediate its ends to each of said independent axles between each of said pair of wheels, a plurality of pairs of spaced spring supports pivotally mounted on said frame, each of said independent spring suspension means having its ends pivotally connected to respective pairs of said pivotally mounted spring supports, said independent spring suspension means yieldably resisting torsional deflection and the lateral tilting movement of its associated pair of wheels, a vertically extending member attached to each of said independent axles, a stop member adjustably positionable in the path of movement of the free upper end of said member whereby the vertical deflection of said independent suspension means is limited, and power operated means attached to said mounting means for swinging same to simultaneously alter the relative elevation of said rolls whereby one or both of said rolls may be moved into ground-engaging position to form the support for said vehicle.

7. A road rolling vehicle comprising a ballast retaining frame, a transversely extending shaft having its ends rotatably mounted on said frame, a pair of axially spaced roll supporting members fixed to said transversely extending shaft, a ground-engaging roll journalled for free rotation in said pair of members, a second ground-engaging roll disposed in substantially parallel spaced relationship with said other ground-engaging roll, said second ground-engaging roll comprising more than two pair of laterally spaced pneumatic tired wheels, independent axles for each pair of said wheels, independent spring suspension means for each of said axles, said spring suspension means being attached intermediate its ends to said axles between the associated pair of wheels, a plurality of laterally spaced arms fixed to said transversely extending shaft in fixed angular relationship with said pair of axially spaced roll supporting members, one end of each of said arms forming a pivotal support for one end of each of said independent spring suspension means, a second set of arms rockably mounted on said frame in spaced relationship with said first named arms, the free ends of each of said second set of arms pivotally supporting the other end of each of said spring suspension means, and power operated means attached to said frame and said pair of axially spaced roll supporting members for swinging said member to simultaneously alter the relative elevation of both of said rolls to selectively position one or both of said rolls into ground-engaging position.

8. A road rolling vehicle comprising a ballast retaining frame, a transversely extending shaft rotatably journaled on said frame, a pair of elongated laterally spaced roll supporting members fixed to said transversely extending shaft, a ground-engaging roll rotatably journaled in said pair of elongated members, a second ground-engaging roll disposed in substantially parallel spaced relationship with said other roll, said second roll comprising more than two laterally spaced pairs of pneumatic tired wheels, independent axles on which each pair of wheels are mounted, separate spring suspension means for each of said axles, each of said spring suspension means being fixedly attached intermediate its ends to one of said axles between its associated pair of wheels, a plurality of laterally spaced arms mounted on said transversely extending shaft in the same fixed angular relationship with said first named pair of elongated roll supporting members, one end of each of said arms forming a pivotal support for one end of each of said spring suspension means, a second set of arms rockably mounted on said frame in aligned spaced relationship with said first named arms, the free end of each of said second set of arms pivotally supporting the other end of each of said spring means, an upwardly extending member journaled between each pair of axially aligned pneumatic tired wheels, guide means operatively associated with the free end of said upright member to guide the lateral movement thereof, and manually adjustable stop means on said guide means engageable with the opposite sides of said upright member to limit the lateral tilting movement thereof, and power operated means attached to said frame and said pair of axially spaced roll supporting members for swinging said members as a unit to simultaneously alter the relative elevation of both of said rolls to selectively position one or both of said rolls into ground-engaging position.

9. A road rolling vehicle comprising a ballast retaining frame, a transversely extending shaft rotatably journaled on said frame, a pair of elongated axially spaced roll supporting members fixed to said transversely extending shaft, a ground-engaging roll journaled for free rotation between said pair of elongated members, a second ground-engaging roll disposed in substantially parallel spaced relationship with said other ground-engaging roll, said second ground-engaging roll comprising a plurality of laterally spaced pairs of pneumatic tired wheels, independent axles on which each pair of wheels are rotatably mounted, separate spring suspension means for each of said axles, each of said spring suspension means being fixedly attached intermediate its ends to one of said axles between its associated pair of wheels, a plurality of laterally spaced aligned arms secured to said transversely extending shaft in fixed angular relationship with said pair of elongated axially spaced roll supporting members, one of each of said arms forming a pivotal support for one end of each of said separate spring suspension means, a second set of arms rockably mounted on said frame in aligned spaced relationship with said first named arms, the free end of each of said second set of arms pivotally supporting the other end of said separate spring suspension means, an upwardly extending member journaled between each pair of pneumatic tired wheels, a guide means on said frame operatively associated with the free end of said upright member to guide the lateral movement thereof, a pair of laterally spaced stop members adjustably positionable on said guide means engageable with the opposite sides of said upright member to limit the lateral tilting movement thereof, another stop member adjustably positionable above said guide means for selective movement into and out of position above the upper extremity of said upright member, said stop means serving to limit the vertical deflection of said spring means to thereby limit the vertical movement of said associated pair of pneumatic tired wheels to distribute the ballast load substantially equally on the several pairs of wheels, and power operated means attached to said frame and said pair of axially spaced roll supporting members for swinging said members as a unit to simultaneously alter the relative elevation of both of said rolls to selectively position one or both of said rolls into ground-engaging position.

10. A road rolling vehicle comprising a ballast retaining frame, a transversely extending shaft rotatably journaled on said frame, a pair of elongated axially spaced roll supporting members fixed to said transversely extending shaft, a ground-engaging roll rotatably journaled between said pair of elongated members, a second ground-engaging roll substantially in parallel spaced relationship with said other ground-engaging roll, said second ground-engaging roll comprising a plurality of laterally spaced pairs of axially aligned pneumatic tired wheels, independent axles on which each pair of wheels is rotatably mounted, separate spring suspension means for each of said axles, each of said spring suspension means being fixedly attached intermediate its ends to one of said axles between its associated pair of wheels, a plurality of laterally spaced aligned arms secured to said transversely extending shaft in fixed angular relationship with said pair of elongated axially spaced roll supporting members, one of each of said arms forming a pivotal support for one end of each of said separate spring suspension means, a second set of arms rockably mounted on said frame in aligned spaced relationship with said first named arms, the free end of each of said second set of arms pivotally supporting the other end of said separate spring suspension means, an upwardly extending member journaled between each pair of pneumatic tired wheels, a guide means on said frame operatively associated with the upper portion of said upright member to guide the lateral movement thereof, a moveable stop member operatively associated with said guide means for selective positioning into and out of position above the upper extremity of said upright member, said stop member being engageable with the upper extremity of said upright member to limit the vertical reflection of said spring suspension means to thereby limit the vertical movement of its associated pair of pneumatic tired wheels whereby substantially equal distribution of the ballast load may be distributed on the several pairs of wheels, and power operated means attached to said frame and said pair of axially spaced roll supporting members for swinging said members as a unit to simultaneously alter the relative elevation of both of said rolls to selectively position one or both of said rolls into ground-engaging position.

References Cited in the file of this patent

UNITED STATES PATENTS

| | | |
|---|---|---|
| 811,909 | Dunham | Feb. 6, 1906 |
| 941,770 | Englund | Nov. 30, 1909 |
| 1,458,751 | Gailor | June 12, 1923 |
| 1,510,356 | Uffert et al. | Sept. 30, 1924 |
| 1,738,490 | Worley | Dec. 3, 1929 |
| 1,862,753 | Josephs et al. | June 14, 1932 |
| 1,913,822 | Walker | June 13, 1933 |
| 1,938,142 | Hallenbeck | Dec. 5, 1933 |
| 1,962,127 | Balkema | June 12, 1934 |
| 1,996,140 | Bourdon | Apr. 2, 1935 |
| 2,030,311 | Messick | Feb. 11, 1936 |
| 2,039,489 | Messick | May 5, 1936 |
| 2,443,147 | Ritchie | June 8, 1948 |
| 2,466,822 | Pollitz | Apr. 12, 1949 |
| 2,559,427 | Hastings | July 3, 1951 |
| 2,696,770 | McKesson | Dec. 14, 1954 |

FOREIGN PATENTS

| | | |
|---|---|---|
| 679,003 | Germany | July 27, 1939 |
| 1,007,547 | France | Feb. 6, 1952 |
| 912,700 | Germany | June 3, 1954 |